US008482236B2

(12) United States Patent
Chang

(10) Patent No.: US 8,482,236 B2
(45) Date of Patent: Jul. 9, 2013

(54) METHOD AND CIRCUIT FOR CONTROLLING MOTOR SPEED

(75) Inventor: Hsiu-Cheng Chang, Taipei (TW)

(73) Assignee: Sea Sonic Electronics Co., Ltd., Taipei (TW)

( * ) Notice: Subject to any disclaimer, the term of this patent is extended or adjusted under 35 U.S.C. 154(b) by 538 days.

(21) Appl. No.: 12/400,463

(22) Filed: Mar. 9, 2009

(65) Prior Publication Data

US 2010/0219784 A1 Sep. 2, 2010

(30) Foreign Application Priority Data

Mar. 2, 2009 (TW) .............................. 98106676 A

(51) Int. Cl.
*H02P 1/04* (2006.01)
(52) U.S. Cl.
USPC ...... 318/471; 318/445; 361/600; 361/679.01; 361/688; 361/689; 361/690; 361/694; 361/695
(58) Field of Classification Search
USPC ..................... 318/445, 471; 361/600, 679.01, 361/688, 689, 690, 694, 695
See application file for complete search history.

(56) References Cited

U.S. PATENT DOCUMENTS

| 4,456,892 | A * | 6/1984 | Vandergraaf .................. 331/176 |
| 5,004,988 | A * | 4/1991 | Ueno et al. ................. 331/116 R |
| 5,687,079 | A | 11/1997 | Bauer et al. |
| 6,400,045 | B1 * | 6/2002 | Hosokawa et al. ........... 307/117 |
| 6,617,815 | B1 | 9/2003 | Krief |
| 6,814,546 | B2 * | 11/2004 | Sekiguchi ......................... 417/3 |
| 6,933,697 | B2 * | 8/2005 | Marando et al. .............. 318/599 |
| 6,935,130 | B2 * | 8/2005 | Cheng et al. .................. 62/259.2 |
| 7,075,261 | B2 * | 7/2006 | Burstein .................. 318/400.11 |
| 7,425,812 | B2 | 9/2008 | Goldberg |
| 7,782,002 | B2 * | 8/2010 | Cook, II ......................... 318/471 |
| 2002/0140389 | A1 * | 10/2002 | Ohki et al. ..................... 318/471 |
| 2002/0196606 | A1 * | 12/2002 | Hirao et al. .................... 361/695 |
| 2003/0065426 | A1 * | 4/2003 | Iino et al. ...................... 700/300 |
| 2003/0120394 | A1 * | 6/2003 | Ziarnik ......................... 700/300 |
| 2003/0202325 | A1 * | 10/2003 | Sasaki .......................... 361/687 |
| 2003/0234630 | A1 * | 12/2003 | Blake ........................... 318/471 |
| 2005/0047762 | A1 | 3/2005 | Liu et al. |
| 2006/0055350 | A1 * | 3/2006 | Lin et al. ....................... 318/268 |
| 2006/0109627 | A1 * | 5/2006 | Lee .............................. 361/695 |
| 2007/0297893 | A1 * | 12/2007 | Alon et al. ...................... 415/47 |
| 2008/0174959 | A1 * | 7/2008 | Sano et al. .................... 361/695 |

* cited by examiner

*Primary Examiner* — Kawing Chan
(74) *Attorney, Agent, or Firm* — Muncy, Geissler, Olds & Lowe, PLLC

(57) ABSTRACT

This invention provides a motor control method which comprises the steps of operating a motor at a fanless operation mode when a ambient temperature is lower than a lower temperature, operating the motor at a silent operation mode when the ambient temperature is higher than the lower temperature and lower than a higher temperature, and operating the motor at a cooling operation mode when the ambient temperature is higher than the higher temperature. When the motor operates at the fanless operation mode, the rotation speed of the motor is zero rpm. When the motor operates at the silent operation mode, the motor operates at a constant rotation speed. When the ambient temperature is higher than the higher temperature, the rotation speed of the motor is a linear function of the temperature and varies between the higher temperature and a maximum temperature corresponding to the full rotation speed of the motor.

7 Claims, 9 Drawing Sheets

# METHOD AND CIRCUIT FOR CONTROLLING MOTOR SPEED

BACKGROUND OF THE PRESENT INVENTION

1. Field of Invention

The present invention relates generally to motor speed control, and more particularly to a method of controlling rotational speed of a motor, wherein the motor's rotational speed is also regulated according to an ambient temperature surrounding the particular exothermic components currently being cooled by a cooling fan operated by the controlled motor. The present invention relates also to a control circuit for implementing the method.

2. Description of Related Arts

Various electronic apparatuses usually have exothermic components that generate heat when the electronic apparatus operates. To cool the exothermic components, fans are often used to evacuate warm air from enclosures in which electronic systems are contained. For example, in personal computers, servers, or the like, the operating frequencies of the CPUs become increasingly higher causing the heat values of the CPUs to increase. Accordingly, computers or similar electronic devices include one or more cooling fans to aid in circulating the air inside the enclosures and for maintaining the ambient temperature inside the enclosures within an acceptable range. The increased airflow provided by fans typically aids in eliminating waste heat that may otherwise build up and adversely affect system operation. Employing cooling fans is especially helpful in ensuring proper operation for certain central processing units (CPUs) with relatively high operating temperatures. These fans are operated by DC controlled motors. Similarly, in power supplies or the like, the loadings of the power supplies become increasingly higher causing the heat values of the exothermic components to increase. Accordingly, power supplies or similar electronic devices include one or more cooling fans to aid in circulating the air inside the enclosures and for maintaining the ambient temperature inside the enclosures within an acceptable range. The increased airflow provided by fans typically aids in eliminating waste heat that may otherwise build up and adversely affect system operation. Employing cooling fans is especially helpful in ensuring proper operation for components of the power supplies with relatively high operating temperatures. These fans are operated by DC controlled motors. In fact, the cooling fans operated by DC controlled motors can be used in many applications to cool all kinds of exothermic components which require cooling.

For the purpose of conserving electric energy and lowering noise caused by unnecessarily high airflow, the rotation speed of the motor is often expected to be controllable. For instance, the motor is generally required to operate at its full speed when the CPU overheats, while when the CPU is already cooled down or in a stand-by mode, the rotation speed of the motor is expected to be lowered accordingly in order to save energy and reduce annoying noise.

As disclosed in U.S. Pat. No. 7,425,812, control of fans in a system typically involves a fan control unit executing a fan control algorithm. A fan control algorithm may determine the method for controlling one or more fans that are configured to evacuate warm air from a system enclosure. For example, the fan control algorithm may specify that a fan's speed should be increased or decreased dependent upon a detected ambient temperature. Such control algorithms may also involve lowering the speed of the fan and allowing the fan to continue running at a minimum speed.

As disclosed in U.S. Pat. No. 5,687,079, it suggests controlling the speed of the fan in a computer according to the temperature of the ambient air detected by a thermistor. The current supplied to the motor operating the fan is controlled by a transistor. The base of the transistor is connected to a circuit comprising a thermistor. A low temperature voltage divider provides a constant low voltage to the motor when air temperature is below 28° C. A high temperature voltage divider provides a constant high voltage to the motor when air temperature is above 40° C. Thus, voltage supplied to the motor is constant below 28° C., increases linearly, and is again constant above 40° C. Referring to FIG. 1, as disclosed in U.S. Pat. No. 6,617,815, a perspective view of a curve of the voltage supplied to a motor according to the ambient temperature in the conventional circuit of the prior art is illustrated. As shown in FIG. 1, the vertical axis shows the voltage and the horizontal axis shows the ambient temperature measured at the temperature sensor. Below a lower temperature $T_{min}$, a constant voltage $V_{min}$ is supplied to the motor. Above a higher temperature $T_{max}$, a constant voltage $V_{max}$ is supplied to the motor. Between $T_{min}$ and $T_{max}$, the voltage supplied to the motor is a linear function of the ambient temperature, and varies between $V_{min}$ and $V_{max}$.

For a temperature control of the type shown in U.S. Pat. No. 5,687,079, three independent parameters need to be set. The first is the minimal fan speed $U_{min}$. The second is the lower temperature $T_{min}$ below which the fan will operate at its minimum speed. The third one is the upper temperature $T_{max}$ above which the fan will operate at its maximum speed. The prior art circuits do not allow easy control of these three parameters; however, these parameters need to be adapted to the type of computer system in which the fan is used.

Referring to FIG. 2, as disclosed in U.S. Pub. No. 2005/0047762, a perspective view of a curve of the rotation speed of a motor relative to an ambient temperature in the conventional circuit of the prior art is illustrated. As shown in FIG. 2, the vertical axis shows the rotation speed of the motor and the horizontal axis shows the ambient temperature measured at the temperature sensor. When the ambient temperature is lower than a lower temperature $T_{min}$, the motor operates at a lower constant rotation speed $U_{min}$. When the ambient temperature is higher than a higher temperature $T_{max}$, the motor operates at a higher constant rotation speed $U_{max}$ or its full rotation speed. When the ambient temperature is in the range of $T_{min}$ to $T_{max}$, the rotation speed of the motor is a linear function of the temperature, and varies between $U_{min}$ and $U_{max}$.

It would thus be desirable to provide a motor speed control method and a control circuit for implementing the motor speed control method in order to conserve electric energy and lower noise caused by unnecessarily high airflow such that the power loss and the power efficiency could be improved.

SUMMARY OF THE PRESENT INVENTION

A main object of the present invention is to provide a motor control circuit and method having three operation modes including a fanless operation mode, a silent operation mode, and a cooling operation mode, wherein when the ambient temperature is lower than a lower temperature, the motor operates at the fanless operation mode and the rotation speed of the motor is zero rpm.

Another object of the present invention is to provide a motor control circuit and method having three operation modes including a fanless operation mode, a silent operation mode, and a cooling operation mode, wherein when the ambient temperature is higher than the lower temperature and lower than a higher temperature, the motor operates at the silent operation mode and the motor operates at a constant rotation speed.

Another object of the present invention is to provide a motor control circuit and method having three operation modes including a fanless operation mode, a silent operation mode, and a cooling operation mode, wherein when the ambient temperature is higher than a higher temperature, the motor operates at a cooling operation mode and the rotation speed of the motor is a linear or curvature function of the temperature.

Another object of the present invention is to provide a motor control circuit and method having two operation modes including a fanless operation mode and a cooling operation mode, wherein when the ambient temperature is lower than a threshold temperature, the motor operates at the fanless operation mode and the rotation speed of the motor is zero rpm.

Another object of the present invention is to provide a motor control circuit and method having two operation modes including a fanless operation mode and a cooling operation mode, wherein when the ambient temperature is higher than the threshold temperature, the motor operates at a cooling operation mode and the rotation speed of the motor is a linear or curvature function of the temperature.

Accordingly, in order to accomplish the one or some or all above objects, the present invention provides a motor control method, comprising the steps of:

operating a motor at a first operation mode when a temperature inside a enclosure in which an electronic system is contained is lower than a first threshold temperature, wherein a rotation speed of the motor is zero rpm when the motor operates at the first operation mode;

operating the motor at a second operation mode when the temperature is higher than the first threshold temperature and lower than a second threshold temperature, wherein the motor operates at a constant rotation speed when the motor operates at the second operation mode; and operating the motor at a third operation mode when the temperature is higher than the second threshold temperature, wherein the rotation speed of the motor is a function of the temperature and varies between the constant rotation speed and a maximum rotation speed when the motor operates at the third operation mode.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

DETAILED DESCRIPTION OF THE PREFERRED EMBODIMENT

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Figure 1:
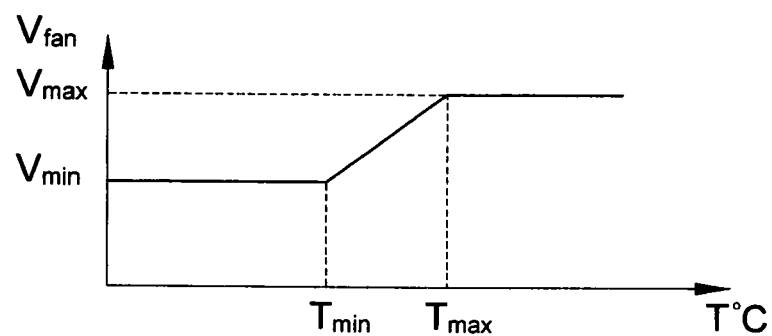
FIG. 1 shows a perspective view of a curve of the voltage supplied to a motor according to the temperature in the conventional circuit of the prior art.
Figure 2:
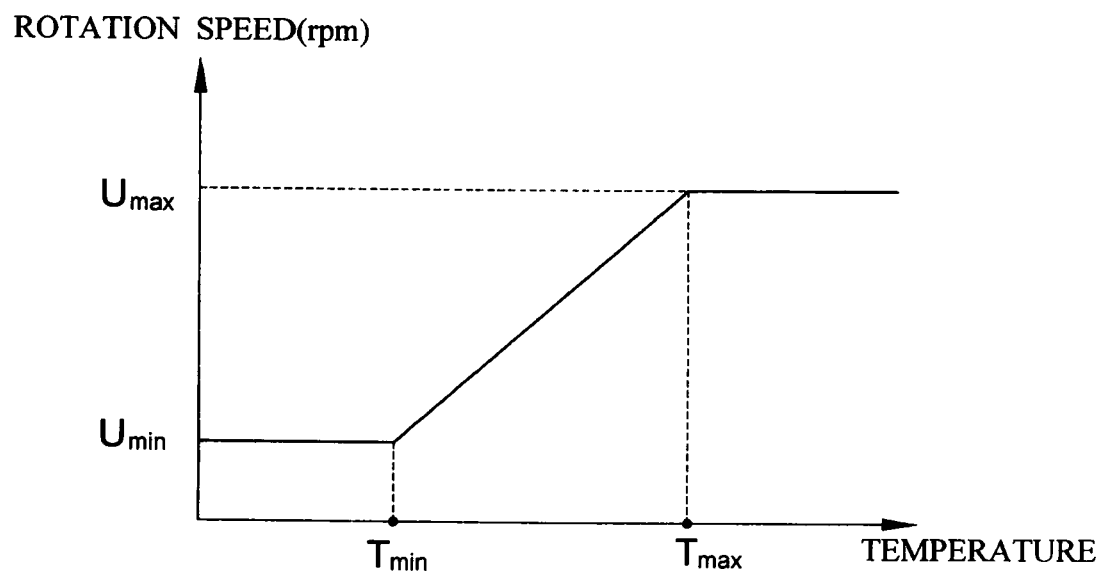
FIG. 2 shows a perspective view of a curve of the rotation speed of a motor relative to an ambient temperature in the conventional circuit of the prior art.
Figure 3A:
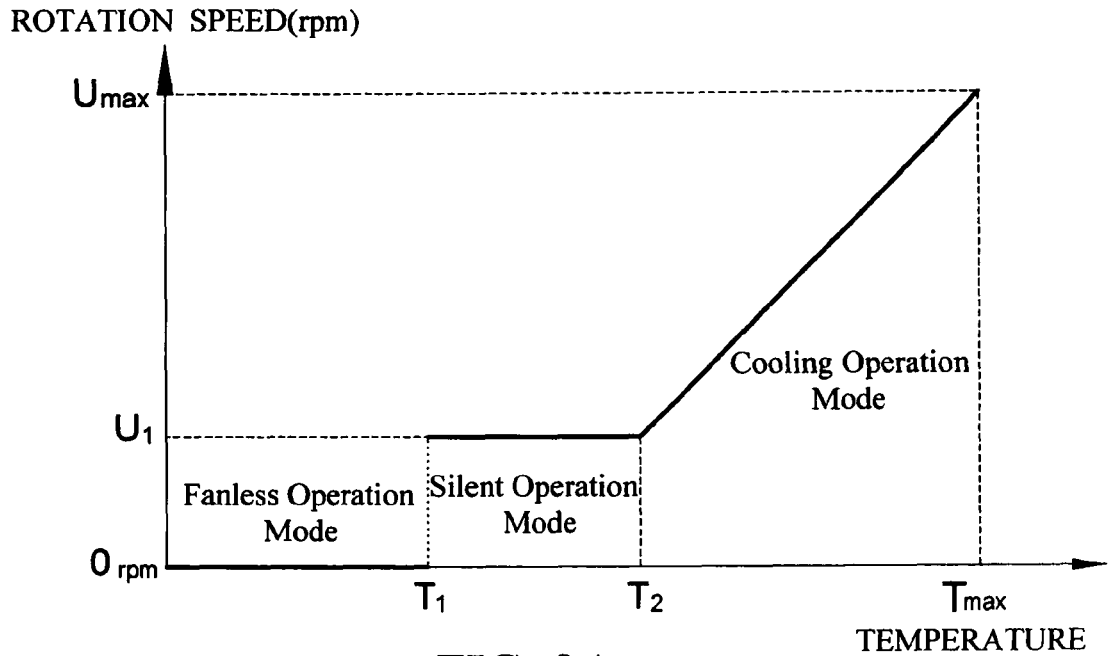
FIG. 3A shows a perspective view of a motor's rotation speed relative to a temperature inside the enclosure in which electronic systems are contained according to a first preferred embodiment of the present invention.

Referring to FIG. 3A, a perspective view of a curve of the rotation speed of a motor relative to an ambient temperature inside the enclosure in which electronic systems are contained according to a first preferred embodiment of the present invention is illustrated. As shown in FIG. 3A, the vertical axis shows the rotation speed of the motor and the horizontal axis shows the ambient temperature measured at a temperature sensor. In this preferred embodiment, the motor having a three-mode speed control in accordance with the present invention includes a fanless operation mode, a silent operation mode, and a cooling operation mode. When the ambient temperature inside the enclosure in which electronic systems are contained is lower than a first threshold temperature, i.e. a lower temperature, $T_1$, the motor operates at the fanless operation mode. When the motor operates at the fanless operation mode, the rotation speed of the motor is zero rpm. When the ambient temperature inside the enclosure in which electronic systems are contained is higher than the first threshold temperature $T_1$ and lower than a second threshold temperature, i.e. a higher temperature, $T_2$, the motor operates at the silent operation mode. When the motor operates at the silent operation mode, the motor operates at a low constant rotation speed $U_1$, i.e. the minimum rotation speed of the motor. When the ambient temperature inside the enclosure in which electronic systems are contained is higher than the second threshold temperature $T_2$, the rotation speed of the motor is a linear function of the ambient temperature and varies between the rotation speed $U_1$ and the rotation speed $U_{max}$. The rotation speed $U_{max}$ could be the full rotation speed of the motor. In other words, when the ambient temperature inside the enclosure in which electronic systems are contained is in the range of $T_2$ to $T_{max}$, the rotation speed of the motor increases linearly with the increase of the ambient temperature inside the enclosure in which electronic systems are contained.

Figure 3B:
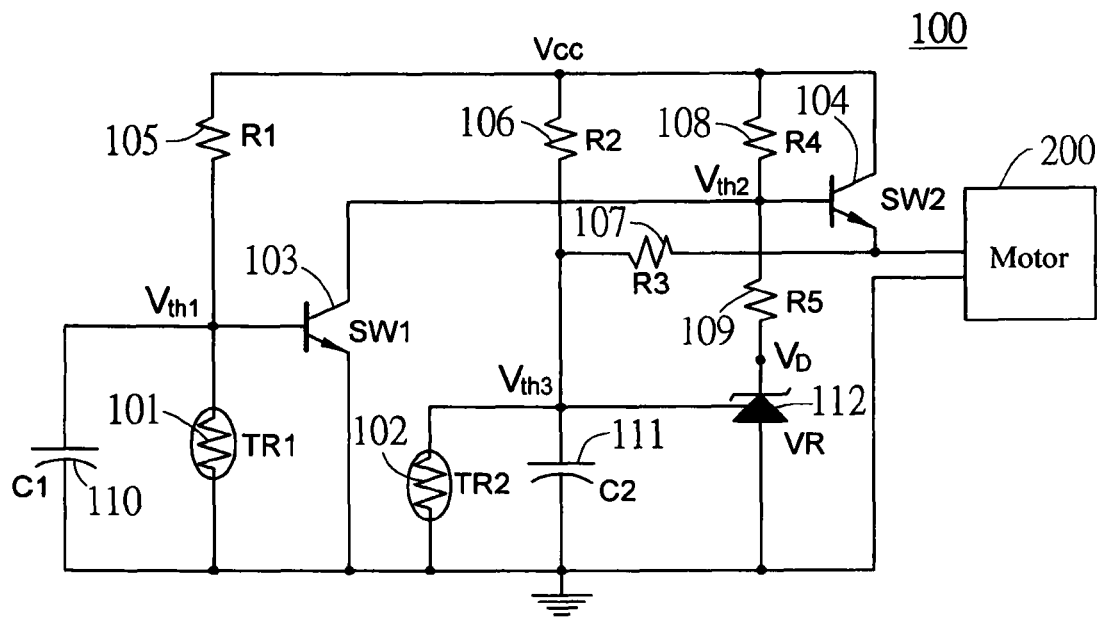
FIG. 3B shows a perspective view of a control circuit of a motor according to the first preferred embodiment of the present invention.

Referring to FIG. 3B, a perspective view of a control circuit of a motor according to the first preferred embodiment of the present invention is illustrated. It shows a possible implementation of the curve of the rotation speed of the motor relative to the ambient temperature as shown in FIG. 3A. As shown in FIG. 3B, the control circuit 100, which is applied to control the rotation speed of a motor 200, includes thermistors TR1 referenced 101, TR2 referenced 102, transistors SW1 referenced 103, SW2 referenced 104, resistors R1 referenced 105, R2 referenced 106, R3 referenced 107, R4 referenced 108, R5 referenced 109, capacitors C1 referenced 110, C2 referenced 111, and a reference regulator VR referenced 112. The thermistors 101, 102 are utilized as temperature sensors which as currently manufactured have resistances at room temperature (25° C.) that vary from 100 ohms to 30 megohms. Generally speaking, high resistance units above 100 k are used for high temperatures, for example from 150° C. to 315° C., while the intermediate resistance units from 2 k to 75 k are used at intermediate temperatures of 66° C. to 150° C., and the low resistance units 100 to 1 k are for measuring low temperatures from −73° C. to 66° C. Preferably, the sensor field in the enclosure is set to the thermistors or the thermistors are located in the middle of the enclosure, where its temperature is representative of the ambient temperature of the different components of the computer, server, power supply, or the like.

The thermistor 101 is connected in series with the resistor 105 between a voltage Vcc and ground, with Vcc the 12 volt provided in usual computer systems or power supply systems. The thermistor 102 is also connected in series with the resistor 106 between the voltage Vcc and ground. According to one feature of the invention, the capacitor 110 with a capacitance C1 is connected in parallel with the thermistor 101. The capacitor 110 is utilized to reduce noise. The base of the transistor 103 is connected between the resistor 105 and the thermistor 101. The emitter of the transistor 103 is grounded and the collector of the transistor 103 is connected to the base of the transistor 104. The base of the transistor 104 is connected between the resistor 108 and the resistor 109. A series circuit including the resistor 108, the resistor 109, and the reference regulator 112 is connected between the voltage Vcc and ground. The anode terminal of the reference regulator 112 is grounded and the cathode terminal of the reference regulator 112 is connected in series with the resistor 109. The reference terminal of the reference regulator 112 is connected between the resistor 106 and the thermistor 102. The capacitor 111 is connected in parallel with the thermistor 102. The motor 200 is connected between ground and the emitter of the transistor 104, while the collector of the transistor 104 is connected to the voltage Vcc. The resistor 107 is connected between the emitter of the transistor 104 and the node between the resistor 106 and the thermistor 102. Thus, the voltage Vcc applied to the motor 200 is controlled by the transistor 104 according to the conduction state of the transistor 103.

When the control circuit operates at the fanless operation mode, i.e. the ambient temperature in the enclosure is below the first threshold temperature $T_1$, for example 50° C., the resistance of the thermistor 101 is sufficiently high due to the characteristic of the thermistor 101 that its resistance varies with the temperature such that a divided voltage $V_{th1}$ produced by the division of the DC voltage Vcc with the series connection of the thermistor 101 and the resistor 105 is applied to the base of the transistor 103 and turns on the transistor 103. Accordingly, the transistor 104 turned off has the effect of stopping the DC voltage Vcc supplied to the motor 200, so as to stop the motor. Therefore, under the fanless operation mode, it can conserve electric energy and there is no noise caused by unnecessarily airflow such that the power loss and the power efficiency could be improved.

When the control circuit operates at the silent operation mode, i.e. the ambient temperature in the enclosure is higher than the first threshold temperature $T_1$, for example 50° C., and below the second threshold temperature $T_2$, for example 80° C., the resistance of the thermistor 101 is sufficiently low due to the characteristic of the thermistor 101 that its resistance varies with the temperature such that a divided voltage $V_{th1}$ produced by the division of the DC voltage Vcc with the series connection of the thermistor 101 and the resistor 105 is applied to the base of the transistor 103 and turns off the transistor 103.

Furthermore, when the control circuit operates at the silent operation mode, i.e. the ambient temperature in the enclosure is higher than the first threshold temperature $T_1$, for example 50° C., and below the second threshold temperature $T_2$, for example 80° C., the resistance of the thermistor 102 decreases due to the characteristic of the thermistor 102 that its resistance varies with the temperature such that a divided voltage $V_{th3}$ produced by the division of the DC voltage Vcc with the series connection of the thermistor 102 and the resistor 106 is decreased and applied to the reference regulator 112, wherein the divided voltage $V_{th3}$ is set to the value higher than the reference input voltage $V_{ref}$ of the reference regulator 112, so as to maintain an output voltage $V_D$ of the reference regulator 112 at a first low voltage level, such as reference input voltage $V_{ref}$. The reference regulator 112 may be a reference generator and shunt regulator, such as a TL431, that is well known to those skilled in the art. The divided voltage $V_{th3}$ produced by the division of the DC voltage Vcc with the series connection of the thermistor 102 and the resistor 106 is determined by the resistances of the thermistor 102 and the resistor 106. The resistance of the resistor 106 could be set a prompt value so as to maintain the divided voltage $V_{th3}$ higher than the reference input voltage $V_{ref}$ of the reference regulator 112 and then to maintain the voltage $V_D$ at the first low voltage level. Accordingly, a divided voltage $V_{th2}$ produced by the division of the DC voltage Vcc with the series connection of the resistors 108, 109 and the reference regulator 112 is maintained at a second low voltage level and applied to the transistor 104, so as to drive the motor 200 at a low constant rotation speed $U_1$. Therefore, under the silent operation mode, it can have the effect of lowering noise caused by unnecessarily high airflow such that the power loss and the power efficiency could be improved.

When the control circuit operates at the cooing operation mode, i.e. the ambient temperature in the enclosure is higher than the second threshold temperature $T_2$, for example 80° C., the resistance of the thermistor 101 is sufficiently low due to the characteristic of the thermistor 101 that its resistance varies with temperature such that a divided voltage $V_{th1}$ produced by the division of the DC voltage Vcc with the series connection of the thermistor 101 and the resistor 105 is applied to the base of the transistor 103 and turns off the transistor 103.

Furthermore, when the control circuit operates at the cooling operation mode, i.e. the ambient temperature in the enclosure is higher than the second threshold temperature $T_2$, for example 80° C., the resistance of the thermistor 102 linearly decreases due to the characteristic of the thermistor 102 that its resistance varies with temperature such that the divided voltage $V_{th3}$ produced by the division of the DC voltage Vcc with the series connection of the thermistor 102 and the resistor 106 is linearly decreased and applied to the reference regulator 112, wherein the divided voltage $V_{th3}$ is set to the value lower than the reference input voltage $V_{ref}$ of the reference regulator 112, so as to linearly increase the voltage $V_D$. Accordingly, a divided voltage $V_{th2}$ produced by the division of the DC voltage Vcc with the series connection of the resistors 108, 109 and the reference regulator 112 is linearly increased and applied to the transistor 104, such that the rotation speed of the motor 200 increases linearly with the increase of the ambient temperature. The slope of dU/dT of the rotation curve may be adjusted using the resistor 107, so as to adjust the resistance R3. Therefore, under the cooling operation mode, it can have the effect of linearly increasing the rotation speed of the motor 200 because of the linear increase of the ambient temperature such that the fan could be especially helpful in ensuring proper operation for the system with relatively high operating temperatures.

Figure 3C:
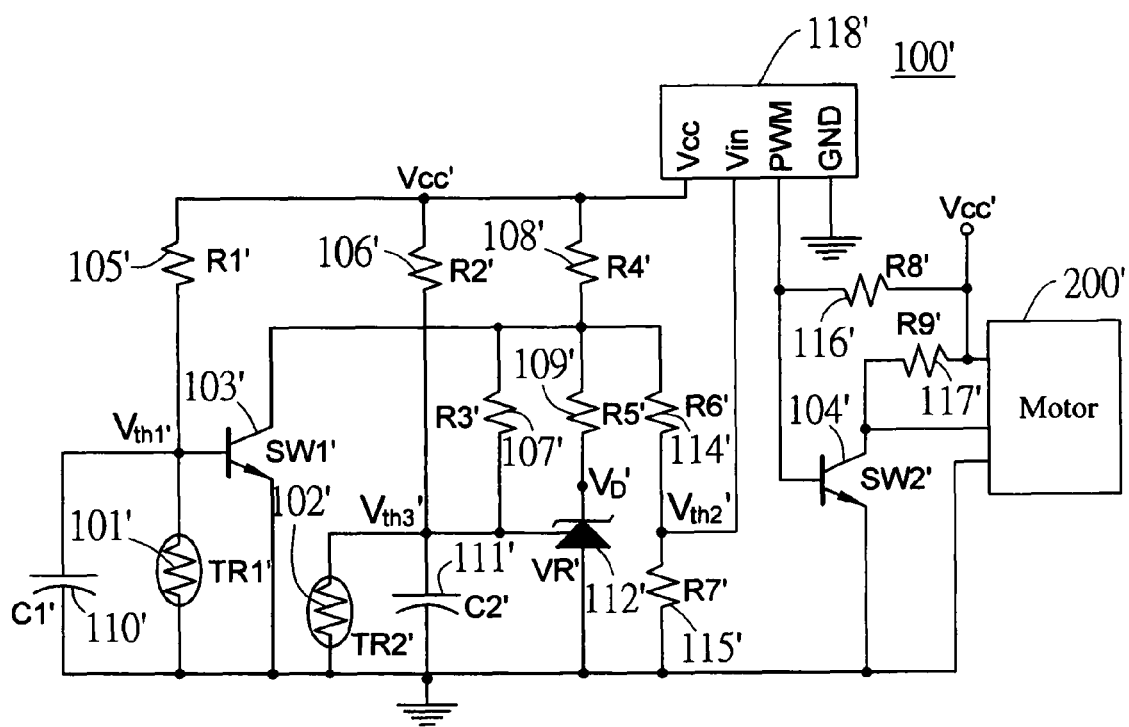
FIG. 3C shows a perspective view of another control circuit of a motor according to the first preferred embodiment of the present invention.

Referring to FIG. 3C, a perspective view of another control circuit of a motor according to the first preferred embodiment of the present invention is illustrated. It shows a possible implementation of the curve of the rotation speed of the motor relative to the ambient temperature as shown in FIG. 3A. As shown in FIG. 3C, the control circuit 100', which is applied to control the rotation speed of a motor 200', includes thermistors TR1' referenced 101', TR2' referenced 102', transistors SW1' referenced 103', SW2' referenced 104', resistors R1' referenced 105', R2' referenced 106', R3' referenced 107', R4' referenced 108', R5' referenced 109', R6' referenced 114', R7' referenced 115', R8' referenced 116', R9' referenced 117', capacitors C1' referenced 110', C2' referenced 111', a reference regulator VR' referenced 112', and a PWM IC 118'. The thermistors 101, 102 are utilized as temperature sensors. Preferably, the sensor field in the enclosure is set to the thermistors or the thermistors are located in the middle of the enclosure, where its temperature is representative of the temperature of the different components of the computer, server, power supply, or the like.

The thermistor 101' is connected in series with the resistor 105' between a voltage Vcc' and ground, with Vcc' the 12 volt provided in usual computer systems or power supply systems. The thermistor 102' is also connected in series with the resistor 106' between a voltage Vcc' and ground. According to one feature of the invention, the capacitor 110' with a capacitance C1' is connected in parallel with the thermistor 101'. The capacitor 110' is utilized to reduce noise. The base of the transistor 103' is connected between the resistor 105' and the thermistor 101'. The emitter of the transistor 103' is grounded. A series circuit including the resistor 108', the resistor 109', and the reference regulator 112' is connected between the voltage Vcc' and ground. The anode terminal of the reference regulator 112' is grounded and the cathode terminal of the reference regulator 112' is connected in series with the resistor 109'. The reference terminal of the reference regulator 112' is connected between the resistor 106' and the thermistor 102'. The capacitor 111' is connected in parallel with the thermistor 102'. The collector of the transistor 103' is connected to the node between the resistor 108' and the resistor 109'. The resistor 107' is connected between the reference terminal of the reference regulator 112' and the node between the resistor 108' and the resistor 109'. A series circuit including the resistor 114' and the resistor 115' is connected between the collector of the transistor 103' and ground. The PWM IC 118' has four terminals, Vcc, Vin, PWM, and GND. The terminal Vcc of the PWM IC 118' is connected to the voltage Vcc'. The terminal Vin of the PWM IC 118' is connected to the node between the resistor 114' and the resistor 115'. The terminal GND of the PWM IC 118' is grounded. The base of the transistor 104' is connected to one terminal of the resistor 116' and the terminal PWM of the PWM IC 118'. The other terminal of the resistor 116' is connected to the voltage Vcc' and one terminal of the resistor 117' which is connected to the motor 200'. The emitter of the transistor 104' is grounded. The motor 200' is connected between ground and the collector of the transistor 104' through the resistor 117'. Thus, the voltage Vcc' applied to the motor 200' is controlled by the transistor 104 according to the conduction state of the transistor 103'.

When the control circuit operates at the fanless operation mode, i.e. the ambient temperature in the enclosure is below the first threshold temperature $T_1$, for example 50° C., the resistance of the thermistor 101' is sufficiently high due to the characteristic of the thermistor 101' that its resistance varies with temperature such that a divided voltage $V_{th1}'$ produced by the division of the DC voltage Vcc with the series connection of the thermistor 101' and the resistor 105' is applied to the base of the transistor 103' and turns on the transistor 103'. Accordingly, the input voltage of the terminal Vin is set lower than a first threshold voltage, for example 0.8 volt and then the transistor 104 turned off has the effect of stopping the DC voltage Vcc' supplied to the motor 200', so as to stop the motor. Therefore, under the fanless operation mode, it can conserve electric energy and there is no noise caused by unnecessarily airflow such that the power loss and the power efficiency could be improved.

When the control circuit operates at the silent operation mode, i.e. the ambient temperature in the enclosure is higher than the first threshold temperature $T_1$, for example 50° C., and below the second threshold temperature $T_2$, for example 80° C., the resistance of the thermistor 101' is sufficiently low due to the characteristic of the thermistor 101' that its resistance varies with temperature such that a divided voltage $V_{th1}'$ produced by the division of the DC voltage Vcc' with the series connection of the thermistor 101' and the resistor 105' is applied to the base of the transistor 103' and turns off the transistor 103'.

Furthermore, when the control circuit operates at the silent operation mode, i.e. the ambient temperature in the enclosure is higher than the first threshold temperature $T_1$, for example 50° C., and below the second threshold temperature $T_2$, for example 80° C., the resistance of the thermistor 102' decreases due to the characteristic of the thermistor 102' that its resistance varies with temperature such that a divided voltage $V_{th3}'$ produced by the division of the DC voltage Vcc with the series connection of the thermistor 102' and the resistor 106' is decreased and applied to the reference regulator 112', wherein the divided voltage $V_{th3}'$ is set to the value higher than the reference input voltage $V_{ref}$ of the reference regulator 112', so as to maintain a voltage $V_D'$ at a first low voltage level, such as reference input voltage $V_{ref}'$. The reference regulator 112' may be a reference generator and shunt regulator, such as a TL431, that is well known to those skilled in the art. The divided voltage $V_{th3}'$ produced by the division of the DC voltage Vcc' with the series connection of the thermistor 102' and the resistor 106' is determined by the resistances of the thermistor 102' and the resistor 106'. The resistance of the resistor 106' could be set a prompt value so as to maintain the divided voltage $V_{th3}'$ higher than the reference input voltage $V_{ref}'$ of the reference regulator 112' and then to maintain the voltage $V_D'$ at the first low voltage level. Accordingly, a divided voltage $V_{th2}'$ produced by the division of the DC voltage Vcc' with the series connection of the resistors 108', 109', 114', 115', and the reference regulator 112' is maintained at a second low voltage level, for example 1.8 volt, and applied to the terminal Vin of the PWM IC 118', such that the terminal PWM of the PWM IC 118' could output a PWM pulse having 50% duty cycle so as to drive the motor 200' at a low constant rotation speed $U_1$. Therefore, under the silent operation mode, it can have the effect of lowering noise caused by unnecessarily high airflow such that the power loss and the power efficiency could be improved.

When the control circuit operates at the cooing operation mode, i.e. the ambient temperature in the enclosure is higher than the second threshold temperature $T_2$, for example 80° C., the resistance of the thermistor 101' is sufficiently low due to the characteristic of the thermistor 101' that its resistance varies with temperature such that a divided voltage $V_{th1}'$ produced by the division of the DC voltage Vcc' with the series connection of the thermistor 101' and the resistor 105' is applied to the base of the transistor 103' and turns off the transistor 103'.

Furthermore, when the control circuit operates at the cooling operation mode, i.e. the ambient temperature in the enclosure is higher than the second threshold temperature $T_2$, for example 80° C., the resistance of the thermistor 102' linearly decreases due to the characteristic of the thermistor 102' that its resistance varies with temperature such that a divided voltage $V_{th3}'$ produced by the division of the DC voltage Vcc with the series connection of the thermistor 102' and the resistor 106' is linearly decreased and applied to the reference regulator 112', wherein the divided voltage $V_{th3}'$ is set to the value lower than the reference input voltage $V_{ref}'$ of the reference regulator 112', so as to linearly increase the voltage $V_D'$. Accordingly, a divided voltage $V_{th2}'$ produced by the division of the DC voltage Vcc with the series connection of the resistors 108', 109', 114', 115', and the reference regulator 112' is linearly increased and applied to the terminal Vin of the PWM IC 118', such that the terminal PWM of the PWM IC 118' could output a PWM pulse having a duty cycle from 50% to 100% so as to drive the motor 200' from a rotation speed $U_1$ to a rotation speed Umax. The rotation speed of the motor 200' increases linearly with the increase of the ambient temperature. The slope of dU/dT of the rotation curve may be adjusted using the resistor 107', so as to adjust the resistance R3'. Therefore, under the cooling operation mode, it can have the effect of linearly increasing the rotation speed of the motor 200' because of the linear increase of the ambient temperature such that the fan could be especially helpful in ensuring proper operation for the system with relatively high operating temperatures.

Figure 4A:
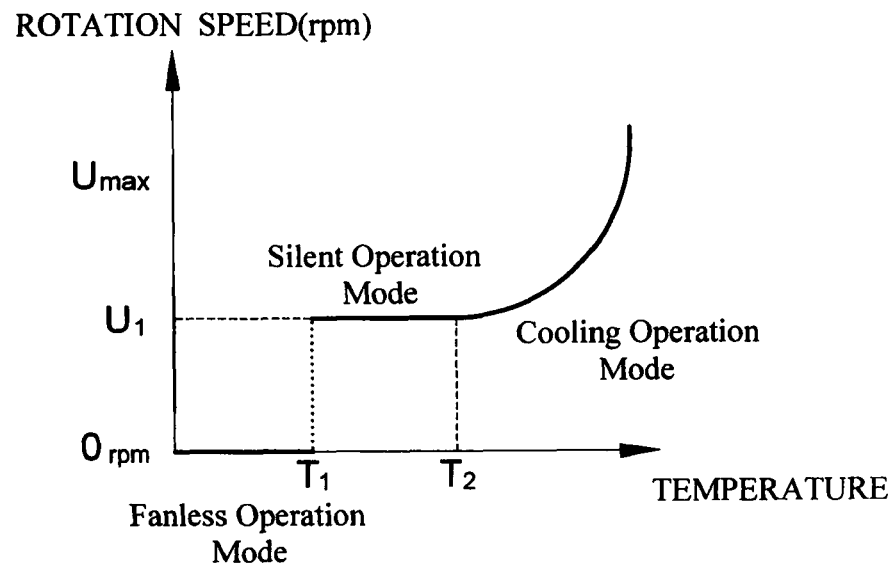
FIG. 4A shows a perspective view of a motor's rotation speed relative to an ambient temperature inside the enclosure in which electronic systems are contained according to a second preferred embodiment of the present invention.

Referring to FIG. 4A, a perspective view of a curve of the rotation speed of a motor relative to a temperature inside the enclosure in which electronic systems are contained according to a second preferred embodiment of the present invention is illustrated. As shown in FIG. 4A, the vertical axis shows the rotation speed of the motor and the horizontal axis shows the temperature measured at a temperature sensor. In this preferred embodiment, the motor having a three-mode speed control in accordance with the present invention includes a fanless operation mode, a silent operation mode, and a cooling operation mode. When the ambient temperature inside the enclosure in which electronic systems are contained is lower than a first threshold temperature, i.e. a lower temperature $T_1$, the motor operates at the fanless operation mode. When the motor operates at the fanless operation mode, the rotation speed of the motor is zero rpm. When the ambient temperature inside the enclosure in which electronic systems are contained is higher than the first threshold temperature $T_1$ and lower than a second threshold temperature, i.e. a higher temperature $T_2$, the motor operates at the silent operation mode. When the motor operates at the silent operation mode, the motor operates at a constant rotation speed $U_1$. When the ambient temperature inside the enclosure in which electronic systems are contained is higher than the second threshold temperature $T_2$, the rotation speed of the motor is a curvature function of the temperature and varies between the rotation speed $U_1$ and the rotation speed $U_{max}$. The rotation speed $U_{max}$ is the full rotation speed of the motor. In other words, when the ambient temperature is in the range of $T_1$ to $T_{max}$, the rotation speed of the motor increases curvedly with the increase of the ambient temperature inside the enclosure in which electronic systems are contained.

Figure 4B:
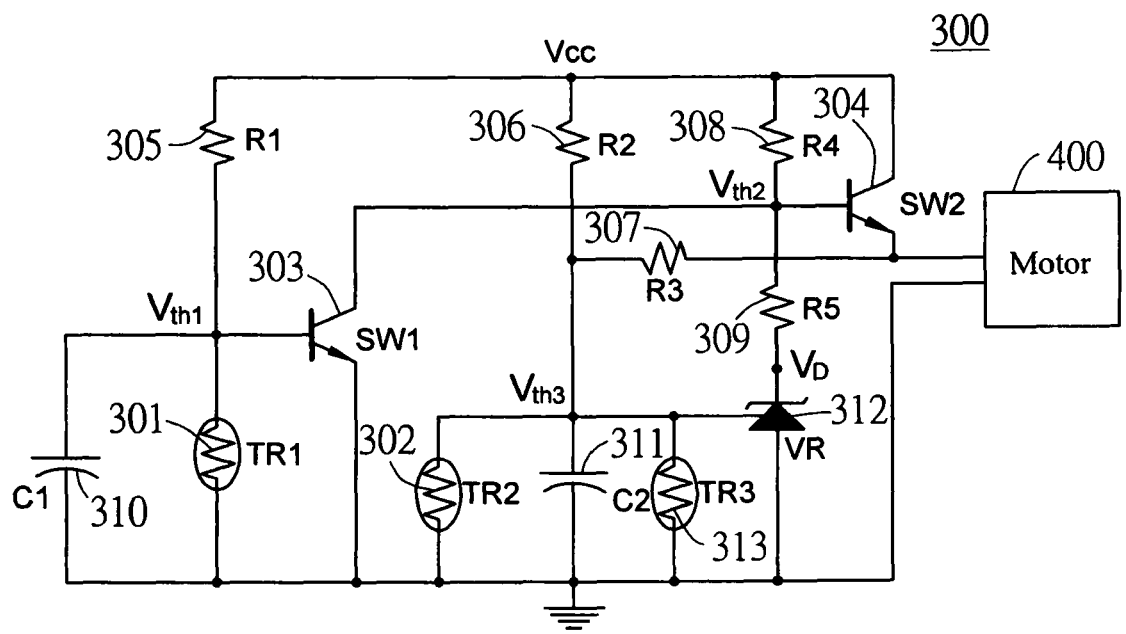
FIG. 4B shows a perspective view of a control circuit of a motor according to the second preferred embodiment of the present invention.

Referring to FIG. 4B, a perspective view of a control circuit of a motor according to the second preferred embodiment of the present invention is illustrated. It shows a possible implementation of the curve of the rotation speed of the motor relative to the ambient temperature as shown in FIG. 4A. The circuitry as shown in FIG. 4B is almost similar to the circuitry as shown in FIG. 3B. In the second preferred embodiment of the present invention, a thermistor TR3, referenced 313, is added to connect in parallel with the thermistor TR2, referenced 302, wherein the function of the thermistor TR2, referenced 302 as shown in FIG. 4B is the same to the function of the thermistor TR2, referenced 102 as shown in FIG. 3B. Accordingly, the working principle of the control circuit which operates at the fanless operation mode and the silent operation mode in the second preferred embodiment of the present invention is almost similar to the working principle of the control circuit which operates at the fanless operation mode and the silent operation mode in the first preferred embodiment of the present invention. There is a mainly different working principle in the cooling operation mode between the first preferred embodiment and the second preferred embodiment.

As shown in FIG. 4B, when the control circuit operates at the cooling operation mode, i.e. the ambient temperature in the enclosure is higher than the second threshold temperature $T_2$, for example 80° C., the resistance of the thermistor 302 in parallel with the thermistor 313 curvedly decreases due to the characteristic of the thermistor 302 in parallel with the thermistor 313 that their resistances vary with temperature such that a divided voltage $V_{th3}$ produced by the division of the DC voltage Vcc with the series connection of the thermistor 302 in parallel with the thermistor 312 and the resistor 306 is curvedly decreased and applied to the reference regulator 312, wherein the divided voltage $V_{th3}$ is set to the value lower than the reference input voltage $V_{ref}$ of the reference regulator 312, so as to curvedly increase the voltage $V_D$. Accordingly, a divided voltage $V_{th2}$ produced by the division of the DC voltage Vcc with the series connection of the resistors 308, 309 and the reference regulator 312 is curvedly increased and applied to the transistor 304, such that the rotation speed of the motor 400 increases curvedly with the increase of the ambient temperature inside the enclosure in which electronic systems are contained. Therefore, under the cooling operation mode, it can have the effect of curvedly increasing the rotation speed of the motor 400 such that the fan could be especially helpful in ensuring proper operation for the system with relatively high operating temperatures.

Figure 4C:
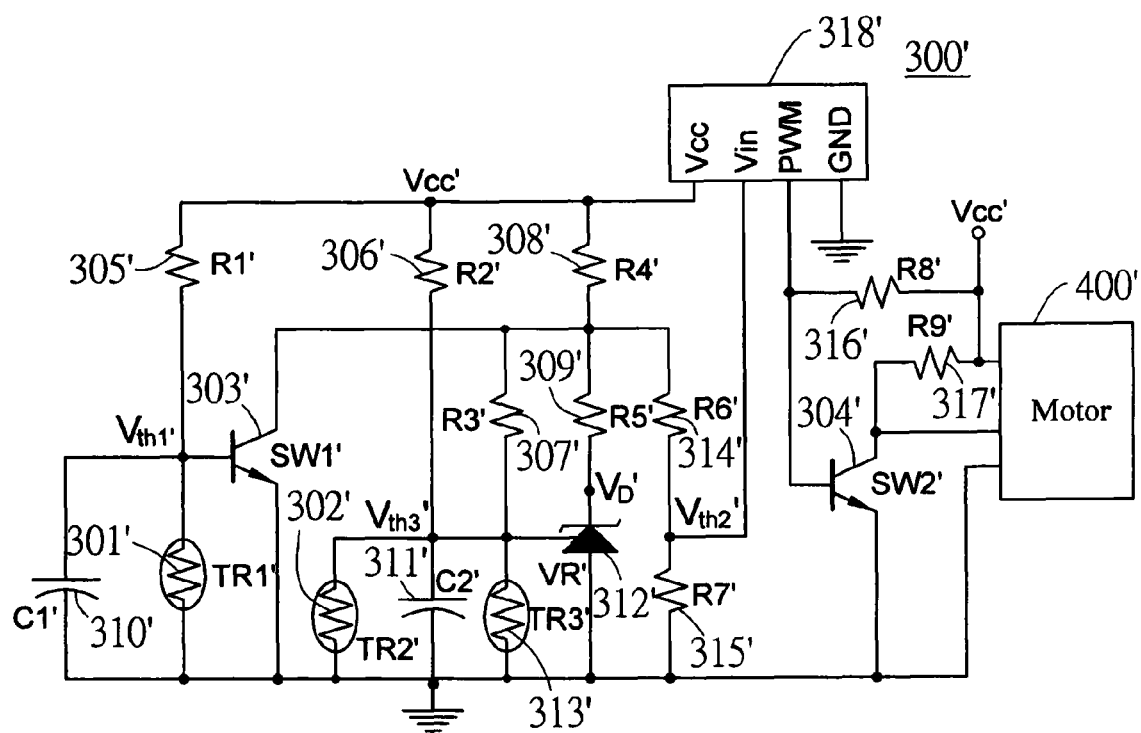
FIG. 4C shows a perspective view of another control circuit of a motor according to the second preferred embodiment of the present invention.

Referring to FIG. 4C, a perspective view of another control circuit of a motor according to the second preferred embodiment of the present invention is illustrated. It shows a possible implementation of the curve of the rotation speed of the motor relative to the ambient temperature as shown in FIG. 4A. The circuitry as shown in FIG. 4C is almost similar to the circuitry as shown in FIG. 3C. In the second preferred embodiment of the present invention, a thermistor TR3', referenced 313', is added to connect in parallel with the thermistor TR2', referenced 302', wherein the function of the thermistor TR2', referenced 302' as shown in FIG. 4C is the same to the function of the thermistor TR2', referenced 102' as shown in FIG. 3C. Accordingly, the working principle of the control circuit which operates at the fanless operation mode and the silent operation mode in the second preferred embodiment of the present invention is almost similar to the working principle of the control circuit which operates at the fanless operation mode and the silent operation mode in the first preferred embodiment of the present invention. There is a mainly different working principle in the cooling operation mode between the first preferred embodiment and the second preferred embodiment.

As shown in FIG. 4C, when the control circuit operates at the cooling operation mode, i.e. the ambient temperature in the enclosure is higher than the second threshold temperature $T_2$, for example 80° C., the resistance of the thermistor 302' in parallel with the thermistor 313' curvedly decreases due to the characteristic of the thermistor 302' in parallel with the thermistor 313' that their resistances vary with temperature such that a divided voltage $V_{th3}'$ produced by the division of the DC voltage Vcc' with the series connection of the thermistor 302' in parallel with the thermistor 313' and the resistor 306' is curvedly decreased and applied to the reference regulator 312', wherein the divided voltage $V_{th3}'$ is set to the value lower than the reference input voltage $V_{ref}$ of the reference regulator 312', so as to curvedly increase the voltage $V_D'$. Accordingly, a divided voltage $V_{th2}'$ produced by the division of the DC voltage Vcc' with the series connection of the resistors 308', 309', 314', 315', and the reference regulator 312' is curvedly increased and applied to the terminal Vin of the PWM IC 118', such that the terminal PWM of the PWM IC 118' could output a PWM pulse having a duty cycle from 50% to 100% so as to drive the motor 200' from a rotation speed $U_1$ to a rotation speed Umax. The rotation speed of the motor 200' increases curvedly with the increase of the ambient temperature. Therefore, under the cooling operation mode, it can have the effect of curvedly increasing the rotation speed of the motor 200' such that the fan could be especially helpful in ensuring proper operation for the system with relatively high operating temperatures.

Figure 5A:
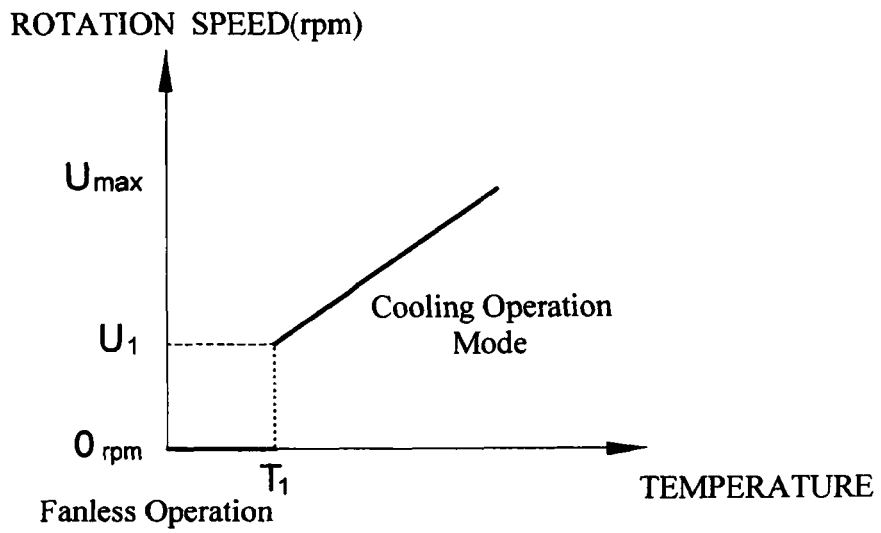
FIG. 5A shows a perspective view of a motor's rotation speed relative to an ambient temperature inside the enclosure in which electronic systems are contained according to a third preferred embodiment of the present invention.

Referring to FIG. 5A, a perspective view of a curve of the rotation speed of a motor relative to a temperature inside the enclosure in which electronic systems are contained according to a third preferred embodiment of the present invention is illustrated. As shown in FIG. 5A, the vertical axis shows the rotation speed of the motor and the horizontal axis shows the temperature measured at a temperature sensor. In this preferred embodiment, the motor having a two-mode speed control in accordance with the present invention includes a fanless operation mode and a cooling operation mode. When the temperature inside the enclosure in which electronic systems are contained is lower than a threshold temperature $T_1$, the motor operates at the fanless operation mode. When the motor operates at the fanless operation mode, the rotation speed of the motor is zero rpm. When the ambient temperature inside the enclosure in which electronic systems are contained is higher than the threshold temperature $T_1$, the motor operates at the cooling operation mode. When the motor operates at the cooling operation mode, the rotation speed of the motor is a linear function of the temperature and varies between $U_1$ and $U_{max}$. The rotation speed $U_{max}$ is the full rotation speed of the motor. In other words, when the ambient temperature inside the enclosure in which electronic systems are contained is in the range of $T_1$ to $T_{max}$, the rotation speed of the motor increases linearly with the increase of the ambient temperature inside the enclosure in which electronic systems are contained.

Figure 5B:
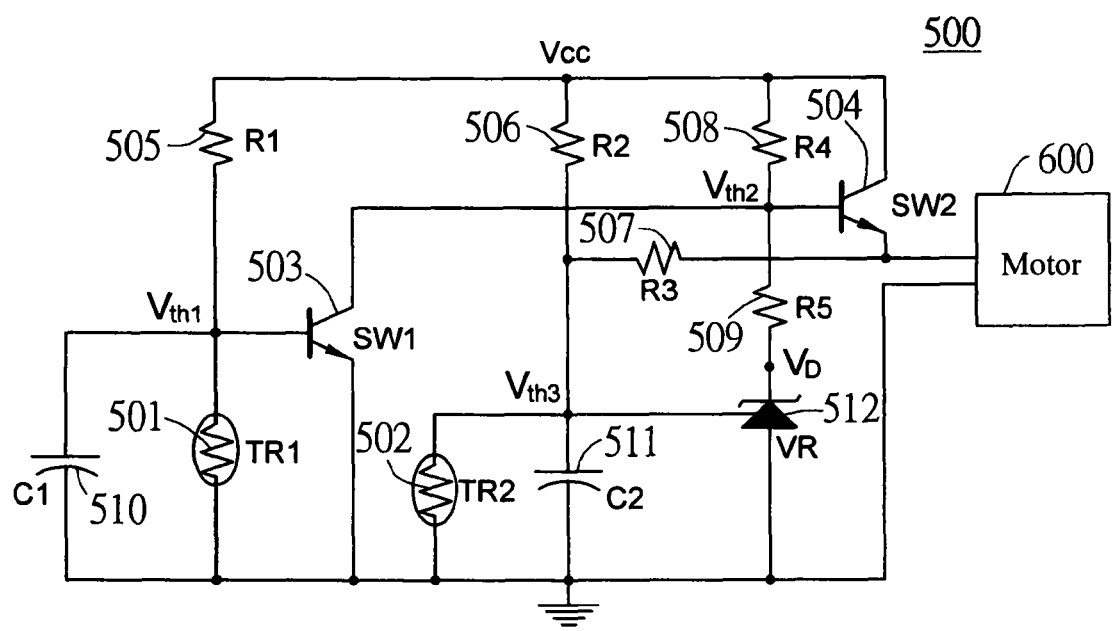
FIG. 5B shows a perspective view of a control circuit of a motor according to the third preferred embodiment of the present invention.

Referring to FIG. 5B, a perspective view of a control circuit of a motor according to the third preferred embodiment of the present invention is illustrated. It shows a possible implementation of the curve of the rotation speed of the motor relative to the ambient temperature as shown in FIG. 5A. The circuitry as shown in FIG. 5B is almost similar to the circuitry as shown in FIG. 3B.

When the control circuit operates at the fanless operation mode, i.e. the ambient temperature in the enclosures is below a threshold temperature $T_1$ inside the enclosure in which electronic systems are contained, for example 50° C., the resistance of the thermistor 501 is sufficiently high due to the characteristic of the thermistor 501 that its resistance varies with temperature such that a divided voltage $V_{th1}$ produced by the division of the DC voltage Vcc with the series connection of the thermistor 501 and the resistor 505 is applied to the base of the transistor 503 and turns on the transistor 503. Accordingly, the transistor 504 turned off has the effect of stopping the DC voltage Vcc supplied to the motor 600, so as to stop the motor. Therefore, under the fanless operation mode, it can conserve electric energy and there is no noise caused by unnecessarily airflow such that the power loss and the power efficiency could be improved.

When the control circuit operates at the cooing operation mode, i.e. the ambient temperature in the enclosure is higher than the threshold temperature $T_1$, for example 50° C., the resistance of the thermistor 501 is sufficiently low due to the characteristic of the thermistor 501 that its resistance varies with temperature such that a divided voltage $V_{th1}$ produced by the division of the DC voltage Vcc with the series connection of the thermistor 501 and the resistor 505 is applied to the base of the transistor 503 and turns off the transistor 503.

Furthermore, when the control circuit operates at the cooling operation mode, i.e. the temperature in the enclosures is higher than the threshold temperature $T_1$, for example 50° C., the resistance of the thermistor 502 linearly decreases due to the characteristic of the thermistor 502 that its resistance varies with temperature such that a divided voltage $V_{th3}$ produced by the division of the DC voltage Vcc with the series connection of the thermistor 502 and the resistor 506 is linearly decreased and applied to the reference regulator 512, wherein the divided voltage $V_{th3}$ is set to the value lower than the reference input voltage $V_{ref}$ of the reference regulator 512, so as to linearly increase the voltage $V_D$. The reference regulator 112 may be a reference generator and shunt regulator, such as a TL431, that is well known to those skilled in the art. Accordingly, a divided voltage $V_{th2}$ produced by the division of the DC voltage Vcc with the series connection of the resistors 508, 509 and the reference regulator 512 is linearly increased and applied to the transistor 504, such that the rotation speed of the motor 600 increases linearly with the increase of the ambient temperature inside the enclosure in which electronic systems are contained. The slope of dU/dT of the rotation curve may be adjusted using the resistor 507', so as to adjust the resistance R3'. Therefore, under the cooling operation mode, it can have the effect of linearly increasing the rotation speed of the motor 600 because of the linear increase of the ambient temperature such that the fan could be especially helpful in ensuring proper operation for the system with relatively high operating temperatures.

Figure 5C:
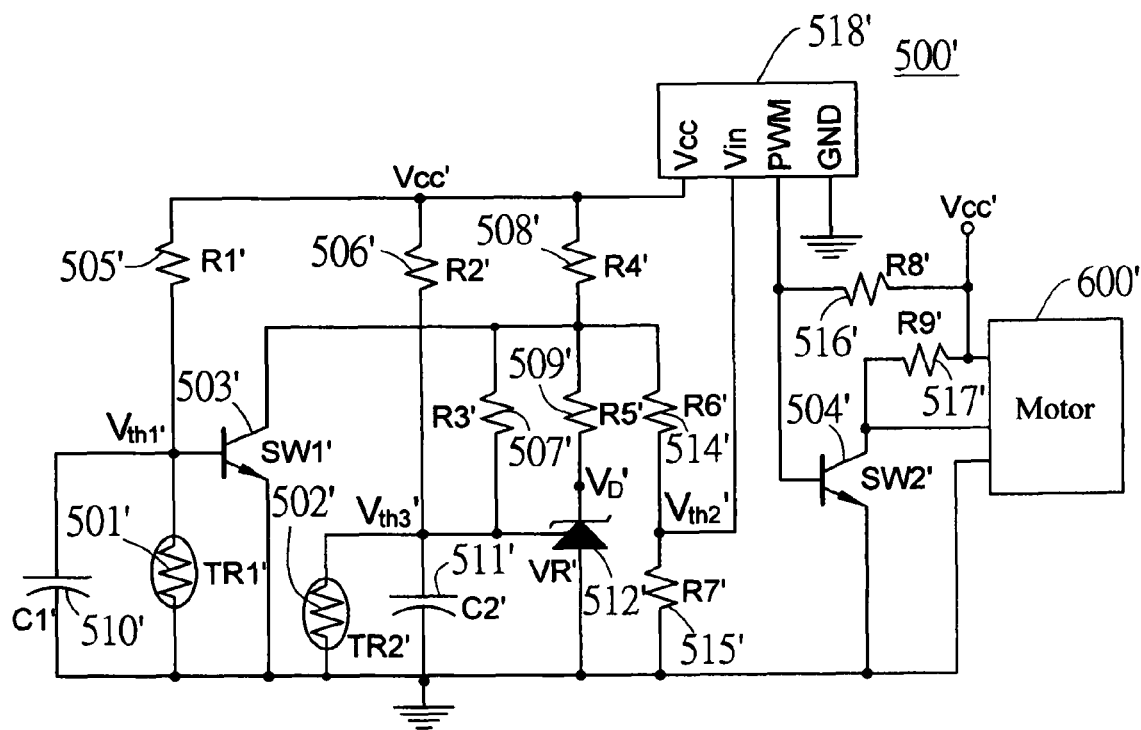
FIG. 5C shows a perspective view of another control circuit of a motor according to the third preferred embodiment of the present invention.

Referring to FIG. 5C, a perspective view of another control circuit of a motor according to the third preferred embodiment of the present invention is illustrated. It shows a possible implementation of the curve of the rotation speed of the motor relative to the ambient temperature as shown in FIG. 5A. The circuitry as shown in FIG. 5C is almost similar to the circuitry as shown in FIG. 3C.

When the control circuit operates at the fanless operation mode, i.e. the temperature in the enclosures is below a threshold temperature $T_1$ inside the enclosure in which electronic systems are contained, for example 50° C., the resistance of the thermistor 501' is sufficiently high due to the characteristic of the thermistor 501' that its resistance varies with temperature such that a divided voltage $V_{th1}'$ produced by the division of the DC voltage Vcc' with the series connection of the thermistor 501' and the resistor 505' is applied to the base of the transistor 503' and turns on the transistor 503'. Accordingly, the transistor 504' turned off has the effect of stopping the DC voltage Vcc' supplied to the motor 600', so as to stop the motor. Therefore, under the fanless operation mode, it can conserve electric energy and there is no noise caused by unnecessarily airflow such that the power loss and the power efficiency could be improved.

When the control circuit operates at the cooing operation mode, i.e. the ambient temperature in the enclosure is higher than the threshold temperature $T_1$, for example 50° C., the resistance of the thermistor 501' is sufficiently low due to the characteristic of the thermistor 501' that its resistance varies with temperature such that a divided voltage $V_{th1}'$ produced by the division of the DC voltage Vcc with the series connection of the thermistor 501' and the resistor 505' is applied to the base of the transistor 503' and turns off the transistor 503'.

Furthermore, when the control circuit operates at the cooling operation mode, i.e. the ambient temperature in the enclosures is higher than the threshold temperature $T_1$, for example 50° C., the resistance of the thermistor 502' linearly decreases due to the characteristic of the thermistor 502' that its resistance varies with temperature such that a divided voltage $V_{th3}'$ produced by the division of the DC voltage Vcc' with the series connection of the thermistor 502' and the resistor 506' is linearly decreased and applied to the reference regulator 512', wherein the divided voltage $V_{th3}'$ is set to the value lower than the reference input voltage $V_{ref}$ of the reference regulator 512', so as to linearly increase the voltage $V_D'$. The reference regulator 112' may be a reference generator and shunt regulator, such as a TL431, that is well known to those skilled in the art. Accordingly, a divided voltage $V_{th2}'$ produced by the division of the DC voltage Vcc' with the series connection of the resistors 508', 509', 514', 515', and the reference regulator 512' is linearly increased and applied to the terminal Vin of the PWM IC 518', such that the terminal PWM of the PWM IC 518' could output a PWM pulse having a duty cycle from 50% to 100% so as to drive the motor 600' from a rotation speed $U_1$ to a rotation speed Umax. The rotation speed of the motor 600' increases linearly with the increase of the ambient temperature. The slope of dU/dT of the rotation curve may be adjusted using the resistor 507', so as to adjust the resistance R3'.

Therefore, under the cooling operation mode, it can have the effect of linearly increasing the rotation speed of the motor 600' because of the linear increase of the ambient temperature such that the fan could be especially helpful in ensuring proper operation for the system with relatively high operating temperatures.

Figure 6A:
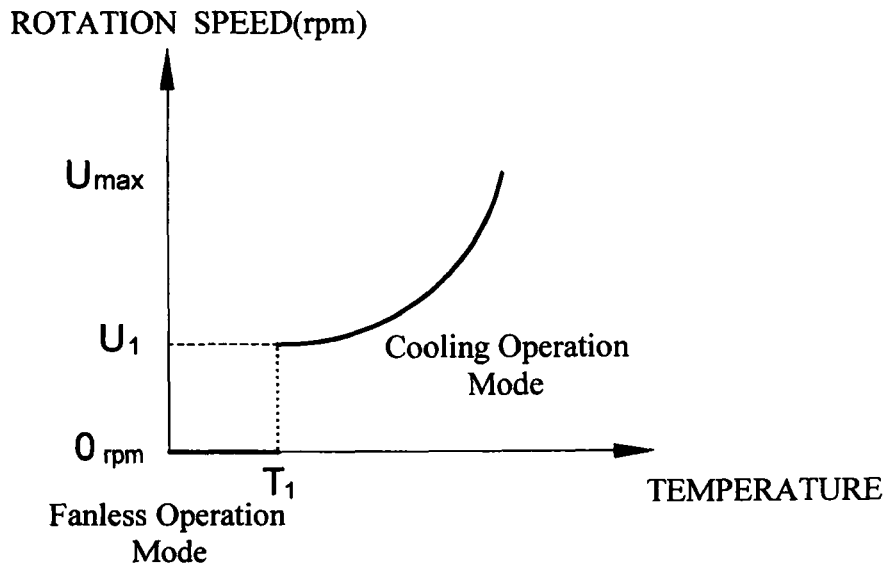
FIG. 6A shows a perspective view of a motor's rotation speed relative to an ambient temperature inside the enclosure in which electronic systems are contained according to a fourth preferred embodiment of the present invention.

Referring to FIG. 6A, a perspective view of a curve of the rotation speed of a motor relative to a ambient temperature inside the enclosure in which electronic systems are contained according to a fourth preferred embodiment of the present invention is illustrated. As shown in FIG. 6A, the vertical axis shows the rotation speed of the motor and the horizontal axis shows the temperature measured at a temperature sensor. In this preferred embodiment, the motor having a two-mode speed control in accordance with the present invention includes a fanless operation mode and a cooling operation mode. When the ambient temperature inside the enclosure in which electronic systems are contained is lower than a threshold temperature $T_1$, the motor operates at the fanless operation mode. When the motor operates at the fanless operation mode, the rotation speed of the motor is zero rpm. When the ambient temperature inside the enclosure in which electronic systems are contained is higher than the threshold temperature $T_1$, the motor operates at the cooling operation mode. When the motor operates at the cooling operation mode, the rotation speed of the motor is a curved function of the temperature and varies between $U_1$ and $U_{max}$. The rotation speed $U_{max}$ is the full rotation speed of the motor. In other words, when the ambient temperature inside the enclosure in which electronic systems are contained is in the range of $T_1$ to $T_{max}$, the rotation speed of the motor increases curvedly with the increase of the ambient temperature.

Figure 6B:
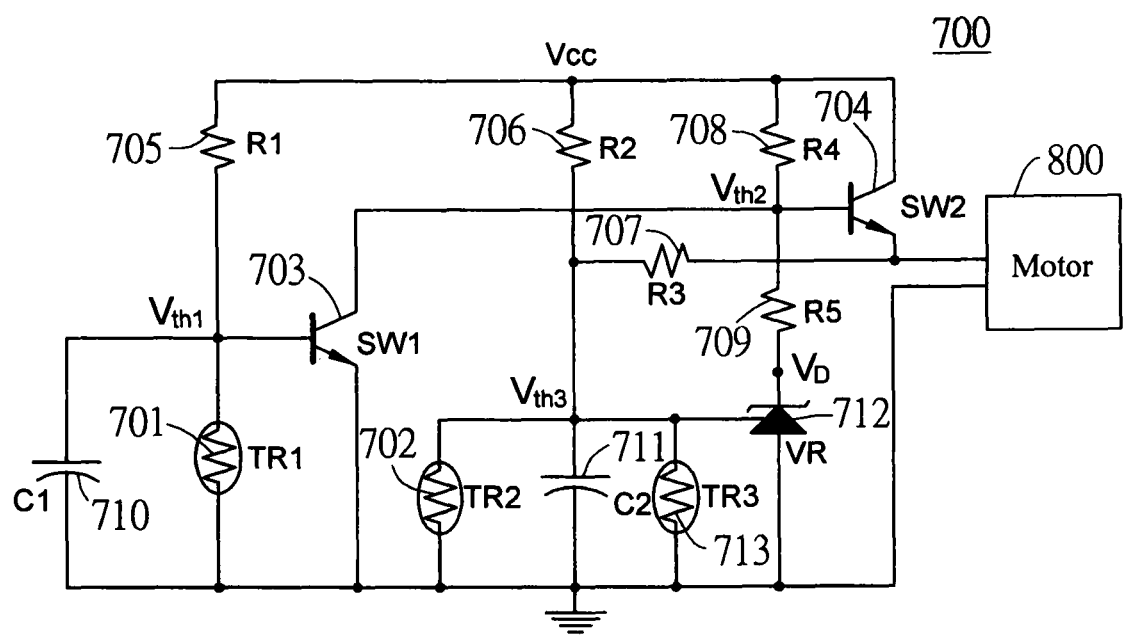
FIG. 6B shows a perspective view of a control circuit of a motor according to the fourth preferred embodiment of the present invention.

Referring to FIG. 6B, a perspective view of a control circuit of a motor according to the fourth preferred embodiment of the present invention is illustrated. It shows a possible implementation of the curve of the rotation speed of the motor relative to the ambient temperature inside the enclosure in which electronic systems are contained as shown in FIG. 6A. The circuitry as shown in FIG. 6B is almost similar to the circuitry as shown in FIG. 4B.

When the control circuit operates at the fanless operation mode, i.e. the ambient temperature in the enclosures is below the threshold temperature $T_1$, for example 50° C., the resistance of the thermistor 701 is sufficiently high due to the characteristic of the thermistor 701 that its resistance varies with temperature such that a divided voltage $V_{th1}$ produced by the division of the DC voltage Vcc with the series connection of the thermistor 701 and the resistor 705 is applied to the base of the transistor 703 and turns on the transistor 703. Accordingly, the transistor 704 turned off has the effect of stopping the DC voltage Vcc supplied to the motor 800, so as to stop the motor. Therefore, under the fanless operation mode, it can conserve electric energy and there is no noise caused by unnecessarily airflow such that the power loss and the power efficiency could be improved.

When the control circuit operates at the cooing operation mode, i.e. the ambient temperature in the enclosures is higher than the threshold temperature $T_1$, for example 50° C., the resistance of the thermistor 701 is sufficiently low due to the characteristic of the thermistor 701 that its resistance varies with temperature such that a divided voltage $V_{th1}$ produced by the division of the DC voltage Vcc with the series connection of the thermistor 701 and the resistor 705 is applied to the base of the transistor 703 and turns off the transistor 703.

Furthermore, when the control circuit operates at the cooling operation mode, i.e. the ambient temperature in the enclosures is higher than the threshold temperature $T_1$, for example 50° C., the resistance of the thermistor 702 curvedly decreases due to the characteristic of the thermistor 702 that its resistance varies with temperature such that a divided voltage $V_{th3}$ produced by the division of the DC voltage Vcc with the series connection of the thermistor 702 and the resistor 706 is curvedly decreased and applied to the reference regulator 712, wherein the divided voltage $V_{th3}$ is set to the value lower than the reference input voltage $V_{ref}$ of the reference regulator 712, so as to curvedly increase the voltage $V_D$. Accordingly, a divided voltage $V_{th2}$ produced by the division of the DC voltage Vcc with the series connection of the resistors 708, 709 and the reference regulator 712 is curvedly increased and applied to the transistor 704, such that the rotation speed of the motor 800 increases curvedly with the increase of the ambient temperature inside the enclosure in which electronic systems are contained. Therefore, under the cooling operation mode, it can have the effect of curvedly increasing the rotation speed of the motor 800 such that the fan could be especially helpful in ensuring proper operation for the system with relatively high operating temperatures.

Figure 6C:
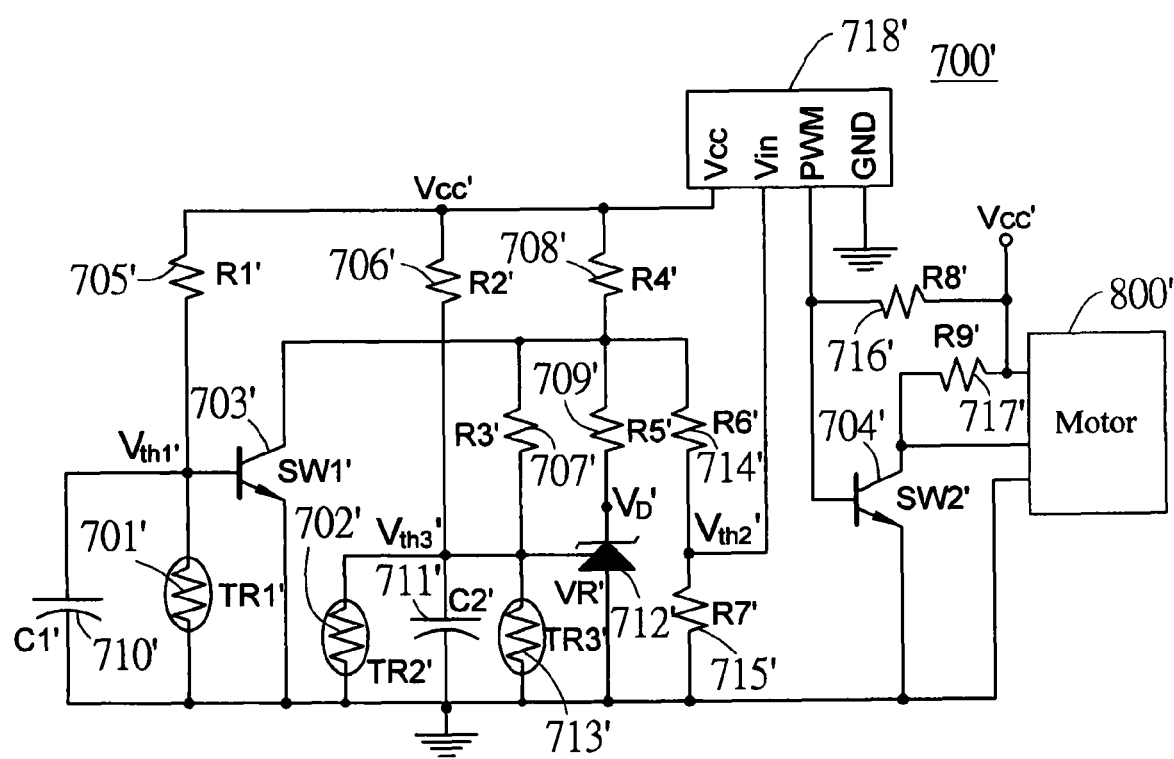
FIG. 6C shows a perspective view of another control circuit of a motor according to the fourth preferred embodiment of the present invention.

Referring to FIG. 6C, a perspective view of another control circuit of a motor according to the fourth preferred embodiment of the present invention is illustrated. It shows a possible implementation of the curve of the rotation speed of the motor relative to the ambient temperature inside the enclosure in which electronic systems are contained as shown in FIG. 6A. The circuitry as shown in FIG. 6C is almost similar to the circuitry as shown in FIG. 4C.

When the control circuit operates at the fanless operation mode, i.e. the ambient temperature in the enclosures is below the threshold temperature $T_1$, for example 50° C., the resistance of the thermistor 701' is sufficiently high due to the characteristic of the thermistor 701' that its resistance varies with temperature such that a divided voltage $V_{th1}'$ produced by the division of the DC voltage Vcc' with the series connection of the thermistor 701' and the resistor 705' is applied to the base of the transistor 703' and turns on the transistor 703'. Accordingly, the transistor 704' turned off has the effect of stopping the DC voltage Vcc' supplied to the motor 800', so as to stop the motor. Therefore, under the fanless operation mode, it can conserve electric energy and there is no noise caused by unnecessarily airflow such that the power loss and the power efficiency could be improved.

When the control circuit operates at the cooing operation mode, i.e. the ambient temperature in the enclosures is higher than the threshold temperature $T_1$, for example 50° C., the resistance of the thermistor 701' is sufficiently low due to the characteristic of the thermistor 701' that its resistance varies with temperature such that a divided voltage $V_{th1}'$ produced by the division of the DC voltage Vcc' with the series connection of the thermistor 701' and the resistor 705' is applied to the base of the transistor 703' and turns off the transistor 703'.

Furthermore, when the control circuit operates at the cooling operation mode, i.e. the ambient temperature in the enclosures is higher than the threshold temperature $T_1$, for example 50° C., the resistance of the thermistor 702' curvedly decreases due to the characteristic of the thermistor 702' that its resistance varies with temperature such that a divided voltage $V_{th3}'$ produced by the division of the DC voltage Vcc' with the series connection of the thermistor 702' and the resistor 706' is curvedly decreased and applied to the reference regulator 712', wherein the divided voltage $V_{th3}'$ is set to the value lower than the reference input voltage $V_{ref}$ of the reference regulator 712', so as to curvedly increase the voltage $V_D'$. Accordingly, a divided voltage $V_{th2}'$ produced by the division of the DC voltage Vcc' with the series connection of the resistors 708', 709', 714', 715', and the reference regulator 712' is curvedly increased and applied to the terminal Vin of the PWM IC 718', such that the terminal PWM of the PWM IC 718' could output a PWM pulse having a duty cycle from 50% to 100% so as to drive the motor 800' from a rotation speed $U_1$ to a rotation speed Umax. The rotation speed of the motor 800' increases curvedly with the increase of the ambient temperature. Therefore, under the cooling operation mode, it can have the effect of curvedly increasing the rotation speed of the motor 800' such that the fan could be especially helpful in ensuring proper operation for the system with relatively high operating temperatures.

Consequently, the present invention could provide a motor control circuit and method having three operation modes including a fanless operation mode, a silent operation mode, and a cooling operation mode. When the ambient temperature is lower than a lower temperature, the motor operates at the fanless operation mode. When the motor operates at the fanless operation mode, the rotation speed of the motor is zero rpm. When the ambient temperature is higher than the lower temperature and lower than a higher temperature, the motor operates at the silent operation mode. When the motor operates at the silent operation mode, the motor operates at a constant rotation speed. When the ambient temperature is higher than a higher temperature, the rotation speed of the motor is a linear function of the temperature.

One skilled in the art will understand that the embodiment of the present invention as shown in the drawings and described above is exemplary only and not intended to be limited.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A motor control method, comprising the steps of:
providing a control circuit in an enclosure in which an electronic system is contained to control rotation speed of a motor, wherein the control circuit includes a first thermistor and a second thermistor for detecting a temperature inside the enclosure, a first resistor connected in series with the first thermistor, a first node between the first thermistor and the first resistor, a second resistor connected in series with the second thermistor, a second node between the second thermistor and the second resistor, a first transistor with a base connected with the first node and a collector connected with a third node, a second transistor with a base connected with the third node and a emitter connected with the motor, and a reference regulator connected with the second node and the third node and having a reference input voltage;

operating the motor at a first operation mode when the temperature inside the enclosure is higher than zero and lower than a first threshold temperature, wherein in the first operation mode, the first thermistor has a first resistance to allow voltage of the first node to be changed to turn on the first transistor while the second transistor is turned off so that the rotation speed of said motor is zero rpm;

operating said motor at a second operation mode when said temperature is higher than said first threshold temperature and lower than a second threshold temperature, wherein in the second operation mode, the first thermistor has a second resistance smaller than the first resistance to allow the first transistor to be turned off while voltage of the second node is changed by the second thermistor to be greater than the reference input voltage of the reference regulator to turn on the second transistor so that said motor operates at a constant rotation speed; and operating said motor at a third operation mode when said temperature is higher than said second threshold temperature, wherein in the third operation mode, the first thermistor has a third resistance smaller than the second resistance to allow the first transistor to be turned off while the voltage of the second node is changed by the second thermistor to be smaller than the reference input voltage of the reference regulator to turn on the second transistor so that said rotation speed of said motor is a function of the temperature and varies between said constant rotation speed and a maximum rotation speed;

wherein the motor changes from the zero speed to the constant rotation speed or vice versa at the same first threshold temperature regardless of whether the temperature is increasing or decreasing.

2. The motor control method, as recited in claim 1, wherein said temperature is representative of the temperature of different components inside one of computer, server, and power supply.

3. The motor control method, as recited in claim 2, wherein said first operation mode is a fanless operation mode, said second operation mode is a silent operation mode, and said third operation mode is a cooling operation mode.

4. The motor control method, as recited in claim 1, wherein said first operation mode is a fanless operation mode, said second operation mode is a silent operation mode, and said third operation mode is a cooling operation mode.

5. The motor control method, as recited in claim 4, wherein said rotation speed of said motor is a linear function of the temperature and varies between said constant rotation speed and said maximum rotation speed when said motor operates at said cooling operation mode.

6. The motor control method, as recited in claim 5, wherein said maximum rotation speed is a full rotation speed of said motor.

7. The motor control method, as recited in claim 1, wherein said rotation speed of said motor increases linearly with the increase of said temperature when said temperature is in the range of said second threshold temperature to a maximum temperature, wherein said maximum temperature is corresponding to a maximum rotation speed of said motor.

* * * * *